(12) United States Patent
Yamashita

(10) Patent No.: US 11,599,105 B2
(45) Date of Patent: Mar. 7, 2023

(54) VEHICLE INSPECTION MANAGEMENT SYSTEM

(71) Applicant: Isuzu Motors Limited, Tokyo (JP)

(72) Inventor: Akira Yamashita, Tokyo (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 17/279,612

(22) PCT Filed: Sep. 24, 2019

(86) PCT No.: PCT/JP2019/037322
§ 371 (c)(1),
(2) Date: Mar. 25, 2021

(87) PCT Pub. No.: WO2020/067042
PCT Pub. Date: Apr. 2, 2020

(65) Prior Publication Data
US 2022/0035360 A1     Feb. 3, 2022

(30) Foreign Application Priority Data

Sep. 28, 2018 (JP) .............................. JP2018-183402

(51) Int. Cl.
   *G05B 23/02*     (2006.01)
   *G06Q 10/04*     (2012.01)
   (Continued)

(52) U.S. Cl.
   CPC ......... *G05B 23/0283* (2013.01); *G06Q 10/04* (2013.01); *G06Q 10/20* (2013.01)

(58) Field of Classification Search
   CPC ..... G05B 23/0283; G06Q 10/04; G06Q 10/20
   (Continued)

(56) References Cited

U.S. PATENT DOCUMENTS

2012/0123951 A1*    5/2012    Hyatt ..................... G06Q 10/10
                                                                                        705/305
2014/0095133 A1    4/2014    Silva et al.
(Continued)

FOREIGN PATENT DOCUMENTS

JP      2002-012132      1/2002
JP      2002-297806     10/2002
(Continued)

OTHER PUBLICATIONS

International Search Report and the Written Opinion dated Nov. 26, 2019 From the International Searching Authority Re. Application No. PCT/JP2019/037322 and Its Translation of Search Report Into English. (10 Pages).

*Primary Examiner* — Lee E Rodak
*Assistant Examiner* — Byung Ro Lee

(57) ABSTRACT

Provided is a vehicle inspection management system that can improve convenience for a person engaged in periodic vehicle inspection by reflecting, in an inspection management table, failure prediction results of vehicle components. This vehicle inspection management system is provided with: a management table output unit that outputs an inspection management table on which the expiry of periodic vehicle inspection is recorded for each vehicle so as to be displayed on a display unit in response to an input instruction; a prediction unit that acquires vehicle control information and predicts failure or degradation of vehicle components; and an additional recording unit that, when the failure or the degradation of the vehicle components is predicted by the prediction unit, additionally records a special inspection recommendation item to a field where the periodic inspection expiry has been recorded.

12 Claims, 6 Drawing Sheets

(51) Int. Cl.
*G06Q 10/00* (2012.01)
*G06Q 10/20* (2023.01)

(58) Field of Classification Search
USPC .......................................................... 702/184
See application file for complete search history.

(56) References Cited

U.S. PATENT DOCUMENTS

| | | | |
|---|---|---|---|
| 2016/0133070 A1* | 5/2016 | Ikeda ................... | G07C 5/0808 |
| | | | 701/31.4 |
| 2017/0116792 A1* | 4/2017 | Jelinek ................... | G06Q 10/20 |
| 2017/0192128 A1* | 7/2017 | Furumoto ............... | G01S 17/58 |
| 2018/0174265 A1* | 6/2018 | Liu ..................... | G06Q 30/0639 |

FOREIGN PATENT DOCUMENTS

| | | |
|---|---|---|
| JP | 2003-044976 | 2/2003 |
| JP | 2003-187011 | 7/2003 |
| JP | 2004-272375 | 9/2004 |
| JP | 2013-171073 | 9/2013 |
| WO | WO 2020/067042 | 4/2020 |

\* cited by examiner

| VEHICLE INSPECTION/PERIODIC INSPECTION SCHEDULE TABLE (OO (MONTH) 20OO (YEAR)–OO (MONTH) 20OO (YEAR)) | | | | | | | | | | | | AS OF OO (MONTH) OO (DATE), 20OO (YEAR) |
|---|---|---|---|---|---|---|---|---|---|---|---|---|
| 🔍 = SPECIAL INSPECTION RECOMMENDATION ITEM | ** (MONTH) 20** (YEAR) | ** (MONTH) 20** (YEAR) | ** (MONTH) 20** (YEAR) | ** (MONTH) | ** (MONTH) | ** (MONTH) | ** (MONTH) | ** (MONTH) | ** (MONTH) | ** (MONTH) | ** (MONTH) | ** (MONTH) |
| VEHICLE IDENTIFICATION NUMBER | SCHEDULE | | | | | | | | | | | |
| VEHICLE IDENTIFICATION NUMBER | SCHEDULE | | | | | | | | | | | |
| VEHICLE IDENTIFICATION NUMBER | SCHEDULE | | | | | | | | | | | |
| VEHICLE IDENTIFICATION NUMBER | SCHEDULE | | | | | | | | | | | |
| VEHICLE IDENTIFICATION NUMBER | SCHEDULE | | | | | | | | | | | |

FIG. 3

VEHICLE INSPECTION/PERIODIC INSPECTION SCHEDULE TABLE (MAY 2018–MAY 2019) AS OF MAY 14, 2018

| SPECIAL INSPECTION RECOMMENDATION ITEM | MAY 2018 | JUNE 2018 | JULY 2018 | AUGUST | SEPTEMBER | OCTOBER | NOVEMBER | DECEMBER | JANUARY | FEBRUARY | MARCH | APRIL | MAY |
|---|---|---|---|---|---|---|---|---|---|---|---|---|---|
| △△130□1118 SCHEDULE | MAY 2018 | PERIODIC INSPECTION JUNE 22 | | | PI | | | | | | VI | | |
| ○○800□3773 SCHEDULE | VEHICLE INSPECTION EXPIRATION MAY 11 | | PERIODIC INSPECTION JULY 1 | | | PI | | | PI | | | PI | VI |
| ▽▽800□100 SCHEDULE | PERIODIC INSPECTION MAY 1 | | | PI | | | PI | | | PI | | VI | PI |

200 — table
210 — highlighted MAY 2018 column
220 — July 1 periodic inspection cell

FIG. 4

| VEHICLE INSPECTION/PERIODIC INSPECTION SCHEDULE TABLE (MAY 2018–MAY 2019) | JUNE 2018 | JULY 2018 | AU-GUST | SEP-TEM-BER | OCT-OBER | NOV-EMBER | DEC-EMBER | JAN-UARY | FEB-RUARY | MARCH | APRIL | MAY |
|---|---|---|---|---|---|---|---|---|---|---|---|---|
| ⊙ = SPECIAL INSPECTION RECOMMEND-ATION ITEM | | | | | | | | | | AS OF MAY 14, 2018 | | |
| △△130□1118 SCHEDULE | PERIODIC INSPECTION JUNE 22 | | | PI | | | | | | | | |
| ○○800□3773 SCHEDULE | | | | | PI | | PI | PI | | VI | PI | VI |
| ▽▽800□100 SCHEDULE | | | PI | | | PI | | | PI | | VI | PI |

· SPECIAL INSPECTION RECOMMENDATION ITEM: INSPECTION OF FOLLOWING ITEM IS NECESSARY AT TIME OF PERIODIC INSPECTION
∗ EXHAUST FILTER

FIG. 6

VEHICLE INSPECTION MANAGEMENT SYSTEM

TECHNICAL FIELD

The present invention relates to a vehicle inspection management system.

BACKGROUND ART

Conventionally, a system for improving operation management by transmitting operation data of a plurality of vehicles owned by a carrier or the like to a management terminal of the carrier and notifying of the operation status has been developed (see, for example, Patent Literature (hereinafter, referred to as "PTL") 1).

In addition, a management system related to a failure of a vehicle has also been developed, in which a management apparatus such as a server predicts the occurrence of a failure of a target vehicle for management and a customer is notified of the result of failure prediction (see, for example, PTL 2). According to such a management system for a vehicle, a business operator or the like (hereinafter referred to as a user) who owns a plurality of vehicles can receive a notification on a vehicle requiring maintenance based on an analysis result by the management apparatus, and can leave the vehicle with a dealer and an inspection and maintenance company (hereinafter referred to simply as "dealer").

CITATION LIST

Patent Literature

PTL 1
Japanese Patent Application Laid-Open No. 2003-044976
PTL 2
Japanese Patent Application Laid-Open No. 2004-272375

SUMMARY OF INVENTION

Technical Problem

Note that, schedule management for periodic inspections of a target vehicle for management, for example, management such as notifying of the deadline (expiration date or the like) of a statutory periodic inspection or regular inspection generally called "vehicle inspection," and/or placing an order to a dealer has been conventionally performed by an administrator of the above-mentioned system by creating a list (inspection management table).

However, the conventional system has had a problem that, with respect to modification or the like on the inspection management table, the burden of data entry work and the like on the administrator becomes large when an immediate inspection is scheduled to perform simultaneously with or before the periodic inspection.

In view of the above-mentioned problem, the present inventors have learned that it is important to construct a mechanism making it possible to automatically reflect the result of prediction of a failure of a vehicle part in the inspection management table, and allowing a user or the like to view the inspection management table, and have devised the present invention.

An objective of the present invention is to provide a vehicle inspection management system capable of reflecting a result of prediction of a failure of a vehicle part in an inspection management table, so as to improve the convenience of a person involved in inspection of a vehicle.

Solution to Problem

A vehicle inspection management system according to the present invention includes:
a management table output section that outputs an inspection management table such that the inspection management table is displayed on a display section in accordance with an input command, the inspection management table recording an expiration time of a periodic inspection of a vehicle for each vehicle;
a prediction section that obtains control information on the vehicle to predict a failure or degradation of a part of the vehicle; and
an additional record section that additionally records a special inspection recommendation item in a column in which the expiration time of the periodic inspection is recorded, when the failure or degradation of the part of the vehicle is predicted by the prediction section.

Advantageous Effects of Invention

According to the present invention, it is possible to reflect the result of prediction of a failure of a vehicle part in an inspection management table so as to improve the convenience of a person involved in the inspection of a vehicle.

BRIEF DESCRIPTION OF DRAWINGS

FIG. 3 illustrates a specific example of a form of an inspection management table to be created;

FIG. 4 illustrates an example of the inspection management table displayed on a terminal;

FIG. 5 is a flowchart illustrating processing performed by the vehicle management server when a user terminal logs in; and FIG. 6 illustrates a display example for a case where a special inspection recommendation item occurrence icon in the inspection management table is selected.

DESCRIPTION OF EMBODIMENTS

Hereinafter, a vehicle management system according to an embodiment will be described with reference to the accompanying drawings.

Figure 1:
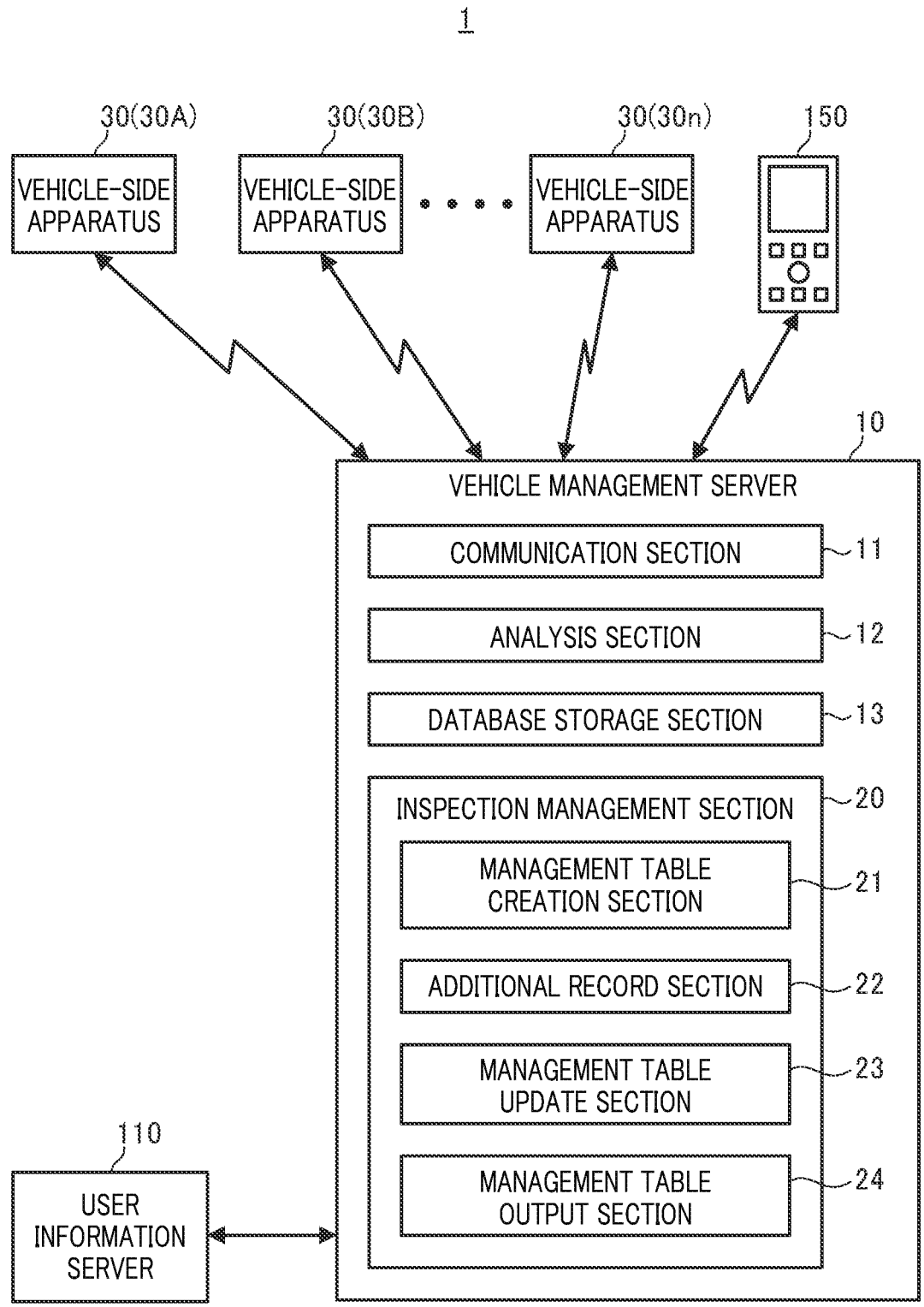
FIG. 1 is an explanatory view for explaining an overall outline of a vehicle inspection management system according to the present embodiment.

FIG. 1 illustrates an overall structure of vehicle management system 1 according to the present embodiment. This vehicle management system 1 includes vehicle management server 10 that manages the times of periodic inspections of a plurality of target vehicles for management (not illustrated) while monitoring the states of these vehicles. Vehicle management server 10 of vehicle management system 1 corresponds to the "vehicle inspection management system" of the present invention.

Specifically, vehicle management system 1 may include, in addition to vehicle management server 10, vehicle-side apparatuses 30 (30A, 30B, . . . , and 30*n*) that are mounted respectively on the aforementioned vehicles and transmit pieces of control information on the vehicles, and various terminals capable of communicating with vehicle management server 10 through a network or the like.

Here, the terminals capable of communicating with vehicle management server 10 include user information server 110 that holds basic information on the target vehicle for management and on a user, and user terminal 150 operated by the user of the target vehicle for management. Note that, the terminals capable of communicating with vehicle management server 10 also include an administrator terminal operated by an administrator who, for example, maintains vehicle management server 10, a terminal operated by a seller or a maintenance company (hereinafter referred to as a dealer terminal), a maintenance history server that holds information on a maintenance history of the target vehicle for management, and the like, which however are not illustrated for simplicity.

As illustrated in FIG. 1, vehicle management server 10 includes communication section 11 such as a modem or a communication interface of a wired or wireless system for communicating with the various terminals described above. Further, vehicle management server 10 includes analysis section 12 that analyzes the pieces of control information obtained from vehicle-side apparatuses 30 (30A, 30B, . . . , and 30n), database storage section 13 that stores the information on each of the vehicles in a database, and inspection management section 20. In one specific example, each of analysis section 12, database storage section 13, and inspection management section 20 is composed of an independent processor (a CPU, an MPU, and/or the like; the same applies hereinbelow).

Analysis section 12 of the above components corresponds to the "prediction section" that obtains control information on a vehicle to predict a failure or degradation of parts of the vehicle. Specifically, analysis section 12 estimates the degradation degree of each part of the vehicle from the result of analysis of the control information, and predicts a part that should be replaced, and/or the time when a failure occurs in the part and thus in the vehicle (the time when the part becomes unusable, the travel of the vehicle is obstructed, the vehicle comes to be incapable of traveling, or the like). A known technique can be applied as a technique (algorithm or the like) for predicting such degradation, failure, or the like of the parts, and thus, the technique for predicting degradation or the like will not be described in detail.

Inspection management section 20 of vehicle management server 10 generates and updates an inspection management table (described below with reference to FIG. 3 and the like) in which schedule tables of periodic inspections for a plurality of target vehicles for management are listed. Here, the "periodic inspection" includes both the statutory periodic inspection and regular inspection (vehicle inspection). In the present embodiment, inspection management section 20 generates and updates the inspection management table for each user who owns a plurality of vehicles.

As illustrated in FIG. 1, inspection management section 20 is functionally divided into management table creation section 21, additional record section 22, management table update section 23, and management table output section 24. Each of these sections 21 to 24 may be composed of a single processor or may be composed of a plurality of processors.

Figure 2:
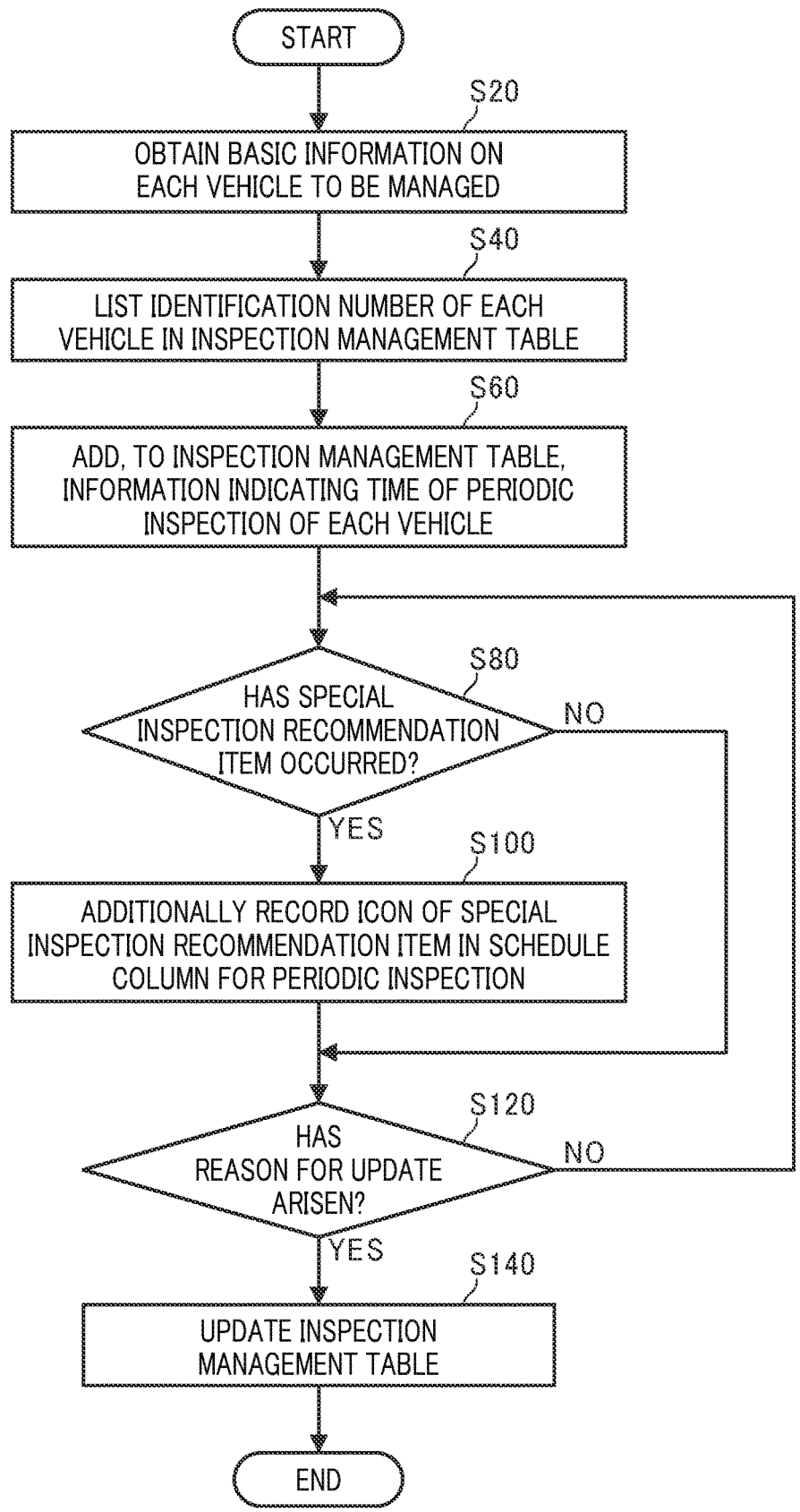
FIG. 2 is a flowchart for explaining processing performed by an inspection management section of the vehicle management server.

FIG. 2 is a flowchart for explaining an outline of processing performed by inspection management section 20 of vehicle management server 10. FIG. 3 illustrates a specific example of the form of the inspection management table created by inspection management section 20. Hereinafter, the functions of the respective sections of inspection management section 20 and the processing such as creation of the inspection management table will be described with reference to FIGS. 2 and 3.

Note that, FIG. 2 illustrates a flow of processing in which inspection management section 20 creates an inspection management table for one user (hereinafter referred to as user A for convenience of description) after user A registers a plurality of vehicles as management targets in user information server 110 through a user registration screen (not illustrated). In FIG. 2, the processing of steps S20 to S60 is based on the function of management table creation section 21, the processing of step S80 and step S100 is based on the function of additional record section 22, and the processing of step S120 is based on the function of management table update section 23.

At step S20, inspection management section 20 is connected to user information server 110 via communication section 11, and obtains the basic information on each of the vehicles of user A held by user information server 110. Here, the "basic information" includes an identification number of each of the vehicles (for example, a character and/or a number written on a license plate (hereinafter referred to as "license plate information"), a manufacturer's serial number, a model number, or the like), a registration date, a vehicle type (type or use), and the like.

At following step S40, inspection management section 20 records (lists) the identification number (license plate information in this example) of the obtained pieces of basic information in the inspection management table for each of the vehicles. Further, inspection management section 20 adds, to the inspection management table, information indicating the time when the periodic inspection of the vehicle should be performed, based on the registration date and the vehicle type of the obtained pieces of basic information (step S60). In the present embodiment, inspection management section 20 adds the time of the expiration date (validity period) of the above-described statutory periodic inspection and regular inspection (hereinafter referred to as "vehicle inspection") to the inspection management table for each of the vehicles (step S60).

Referring now to FIG. 3, the inspection management table has a form in which the period of 13 months including the month to which the current date (creation date or update date; the same applies hereinafter) belongs is divided on a monthly basis for management.

Specifically, the current date is recorded on the right side in the uppermost column of the inspection management table, and the year and month to which the current date belongs and the year and month 12 months after the month of the current date are recorded on the left side in the same column. The left column of the second row of the inspection management table is an explanatory column for explaining that a balloon type icon is a special inspection recommendation item. On the right side of the explanatory column, the period of 13 months including the month to which the current date belongs is divided into columns on a monthly basis. The columns in the third and subsequent rows of the inspection management table are columns in which schedules for periodic inspections for the vehicles are recorded (hereinafter referred to as "schedule columns"), and the identification numbers of the vehicles are recorded in the columns on the left side of these columns.

Further, the period between the year and month to which the current date belongs and the year and month two months after the month of the current date in the inspection management table (i.e., the schedule columns of each of the nearest three months) has a larger recording area than the schedule columns of the other months so that more information can be recorded.

In the present embodiment, the nearest three months including the creation date or update date of the inspection management table correspond to the "first period," and the period from the fourth month to the thirteenth month corresponds to the "second period." In the example illustrated in FIG. 3, the period of three months, which is the shortest cycle of the statutory periodic inspection, is set as the "first period."

Thus, when the inspection management table is displayed on the display section of any terminal, the schedule columns of the months set as the "first period" are displayed with a larger area than the schedule columns of the months set as the "second period," and such a display mode will be described later.

Returning to the description of step S60, the validity periods of the statutory periodic inspection and the vehicle inspection are calculated based on the registration date of the vehicle, and differ depending on the vehicle type. Thus, at step S60, inspection management section 20 calculates the expiration dates of the validity periods of the statutory periodic inspection and the vehicle inspection for each vehicle, and records information on the calculated expiration dates in the corresponding schedule column of the inspection management table.

Specifically, inspection management section 20 records the type of inspection (here, the statutory periodic inspection or vehicle inspection) in the corresponding schedule column using a character of a color corresponding to the type (color different from one type to another). Further, when the corresponding schedule column is in a month within the first period (that is, the nearest three months), inspection management section 20 additionally records information on the month and date of expiration.

Next, inspection management section 20 monitors an analysis result of analysis section 12 and determines whether or not a special inspection recommendation item has occurred (step S80). Here, when inspection management section 20 determines that the special inspection recommendation item has occurred (YES at step S80), the processing proceeds to step S100. On the other hand, when inspection management section 20 determines that no special inspection recommendation item has occurred (NO at step S80), the processing of step S100 is skipped to step S120.

In the present embodiment, the "special inspection recommendation item" means a part that should be inspected during periodic inspection, additionally or intensively. Specifically, a part of the vehicle parts analyzed by analysis section 12 which has degraded to a moderate degree and is predicted to fail or degrade to a degradation degree greater than a threshold during the aforementioned second period corresponds to the "special inspection recommendation item."

That is, when there is a part of a high degradation degree enough to exceed a predetermined threshold (i.e., part in a poor state), it is highly probable that the part, and thus the vehicle, fails before the periodic inspection time, and therefore, an emergency notification is made to the user by e-mail or the like, without regarding the part as the "special inspection recommendation item." On the other hand, in the case of a part of a low degradation degree, it is not necessary to intensively inspect the part in the nearest periodic inspection, and the part is also not regarded as the "special inspection recommendation item."

As a specific example, when long-time use or the like causes degradation (clogging) in a filter of an exhaust purification apparatus of the vehicle, the exhaust purification ability degrades depending on the degree of progress of the clogging. Then, when the degradation degree of the filter exceeds a threshold, the amount of exhaust emitted from the vehicle exceeds a predetermined reference value, eventually possibly leading to a situation in which the vehicle cannot travel normally. Thus, when the degree of progress of the clogging of the filter is moderate (for example, when the exhaust purification ability begins to decrease) and analysis section 12 predicts that the amount of exhaust emitted from the vehicle may exceed the predetermined reference value during the second period, inspection management section 20 determines that the special inspection recommendation item has occurred (YES at step S80).

At step S100, additional record section 22 additionally records a balloon type icon (see FIG. 3) indicative of the occurrence of the special inspection recommendation item in the schedule column in which the nearest expiration time of the periodic inspection of the vehicle is recorded. Further, additional record section 22 associates, with the icon, information to be displayed when the icon is selected later (for example, a message that "inspection of the following item is necessary at the time of the next inspection" and a corresponding part name) and stores the information in a memory or the like.

At step S120, management table update section 23 determines whether or not a reason for updating the inspection management table has arisen. Then, when management table update section 23 determines that the reason for updating the inspection management table has arisen (YES at step S120), the processing proceeds to step S140. On the other hand, when management table update section 23 determines that the reason for updating the inspection management table has not arisen (NO at step S120), the processing returns to step S80, and the processing from step S80 to step S120 described above is repeated.

Here, examples of the reason for updating include a case where the current date is changed, a case where the number of target vehicles for management by user A is increased or decreased, and the like.

At step S140 after it is determined that the reason for updating has arisen, management table update section 23 updates the contents of the inspection management table of user A depending on the reason for updating. For example, when the current date is changed to the first day of the next month, the inspection management table is updated so that the respective columns of the three months constituting the first period and the ten months constituting the second period are shifted to the left by one column.

The inspection management table created and updated by inspection management section 20 as described above is stored in database storage section 13 in association with the identification information of user A (in this example, user ID and password).

FIG. 4 illustrates an example in which the inspection management table for user A created and updated by inspection management section 20 is displayed on the display of any terminal. As illustrated in FIG. 4, the inspection management table is a table used for management of schedules, deadlines, and the like of statutory periodic inspections (hereinafter simply referred to as periodic inspections) and regular inspections (hereinafter referred to as vehicle inspections). In this example, the inspection management table in which the expiration date of the periodic inspection and the expiration time of the vehicle inspection are recorded for each vehicle held by user A is displayed. For simplicity, in FIG. 4, the pieces of license plate information only for three vehicles of "▲▲130□1118," "○○800□3773," and "▼▼800□100" are illustrated as the vehicles for user A, and illustration of the columns for the fourth and subsequent vehicles is omitted.

Further, as described above, the character for the periodic inspections and the character for the vehicle inspections (expirations) in the inspection management table are displayed in different colors. Moreover, as illustrated in FIG. 4, the year and month column and the schedule columns of the current month (May 2018 in the example of FIG. 4) in which the inspection management table is displayed (output) are displayed in a background color different from the background color of the other columns. By employing such a display mode, it becomes easy to identify the type of inspection and to visually recognize the schedule of the nearest months even when the inspection management table is displayed on a small display of a portable terminal or the like. Hereinafter, the inspection management table displayed on the display (display section) of the terminal is referred to as vehicle inspection/periodic inspection schedule table 200.

Here, a description will be given of a flow of processing performed by inspection management section 20 when user A views vehicle inspection/periodic inspection schedule table 200. User A operates user terminal 150 to access a login screen (not illustrated) of a predetermined site on the Internet, and enters the user ID and the password in the screen. By such an operation, a main menu screen (not illustrated) is output to the display section (see FIG. 1) of user terminal 150, and by selecting a button "Check vehicle inspection/periodic inspection schedule" in the screen, vehicle inspection/periodic inspection schedule table 200 is displayed on the display section (see FIG. 4).

Figure 5:
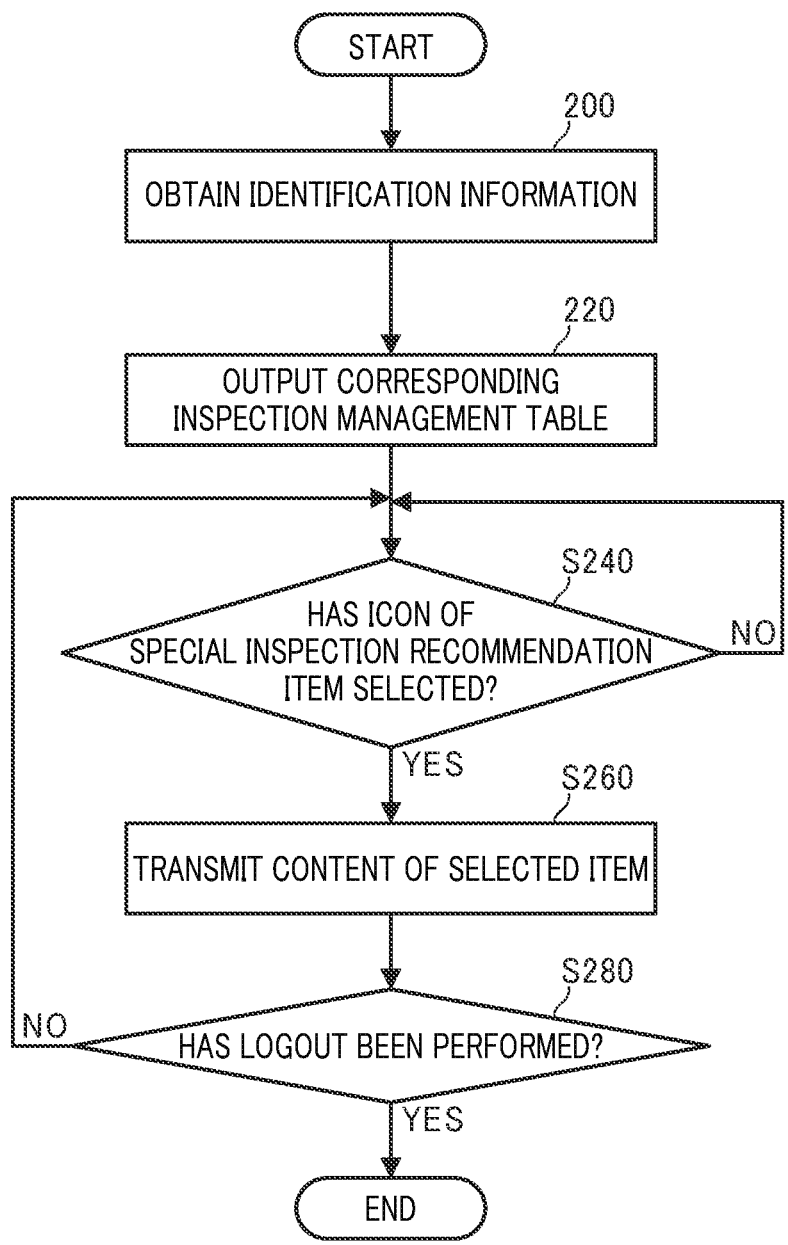

At this time, management table output section 24 of inspection management section 20 executes processing according to a flowchart illustrated in FIG. 5.

Management table output section 24 obtains the identification information (user ID and password) of user A (step S200), reads the data of the inspection management table corresponding to the identification information from database storage section 13, and transmits the data to user terminal 150 (step S220; see FIG. 4).

If necessary, management table output section 24 may additionally transmit, to user terminal 150, a display command that the columns (the year and month columns and the schedule columns) constituting the above-described first period should be displayed more largely than the columns of the above-described second period.

By this processing, in vehicle inspection/periodic inspection schedule table 200, the columns of the nearest three months set as the first period are displayed as enlarged display area 210 larger than the columns of the months of the second period, and display more information.

Specifically, in the "Schedule" columns of enlarged display area 210 (in this example, May, June, and July 2018), one of (1) blank column with no schedule, (2) "Periodic inspection" and its expiration date, and (3) "Vehicle inspection expiration" and its expiration date is displayed.

Further, in vehicle inspection/periodic inspection schedule table 200, special inspection recommendation item occurrence icon 220 is displayed on the right side of the expiration date of the periodic inspection or the vehicle inspection as illustrated in FIG. 4 with respect to the vehicle for which the special inspection recommendation item described above has occurred. This special inspection recommendation item occurrence icon 220 (hereinafter, also referred to simply as "icon") is displayed when the arrival of the expiration date of the periodic inspection or the vehicle inspection is within enlarged display area 210 (i.e., the nearest three months), while not displayed in other cases. This icon 220 can be selected by using an operation input section (cursor, mouse, or the like) of the terminal displaying vehicle inspection/periodic inspection schedule table 200.

Returning to the description with reference to FIG. 5, management table output section 24 determines whether or not icon 220 of the above-described special inspection recommendation item has been selected (step S240). Here, when management table output section 24 determines that icon 220 has not been selected (NO at step S240), the processing returns to step S240, and the determination is repeated. When management table output section 24 determines that icon 220 has been selected (YES at step S240), the processing proceeds to step S260.

At step S260, management table output section 24 reads the content of the selected special inspection recommendation item (additional text data) from the memory or the like, transmits it to user terminal 150, and transmits a command to display the content in a superimposed manner.

FIG. 6 illustrates an example of a display mode of vehicle inspection/periodic inspection schedule table 200 after selection of icon 220. When icon 220 is selected, a message that there is an item (part) which should be inspected additionally at the time of the nearest inspection (periodic inspection in this example) and a corresponding part name ("exhaust filter" in this example) are displayed as a layer above (in front of) the schedule column as illustrated in FIG. 6 with using a relatively wide display area. Note that, when the display area is selected again by the input operation of the terminal in the state illustrated in FIG. 6, the display mode returns to the display mode of balloon type icon 220 as illustrated in FIG. 4 through appropriate communication with management table output section 24.

On the other hand, a blank column with no schedule or up to two characters of "VI" or "PI" meaning the arrival of the expiration date of the vehicle inspection or periodic inspection is displayed in the "Schedule" columns of the second period (in this example, August 2018 to May of the following year), but no expiration date is displayed. Further, as described above, special inspection recommendation item occurrence icon 220 is also not displayed in the schedule columns of the second period.

Note that, it is probable that the expiration dates of both the vehicle inspection and the periodic inspection arrive in one month. In such a case, in the case of a month within enlarged display area 210, "vehicle inspection 6/1, periodic inspection 6/22" is displayed, for example, and special inspection recommendation item occurrence icon 220 is displayed on the right side of the nearer one of the expiration dates (6/1 in the above example). In addition, when the expiration dates of both the vehicle inspection and the periodic inspection are in a month other than the months in enlarged display area 210, the two characters (of different colors) of "VP," which means both the vehicle inspection and periodic inspection, may be displayed, for example.

By employing the display mode as described above, the convenience of management of schedules and the like of periodic inspections and vehicle inspections is remarkably improved, and it is possible to easily confirm the times of expiration of the periodic inspections and vehicle inspections even with a small display of a portable terminal or the like.

At step S280, management table output section 24 determines whether or not user A has logged out. Here, when management table output section 24 determines that user A has not logged out (NO at step S280), the processing returns to step S240 and the processing of above-described step S240 to step S280 is repeated. Repetition of such processing allows for switching between the display mode of icon 220 as illustrated in FIG. 4 and the display mode of the message and the part name as illustrated in FIG. 6 for each special inspection recommendation item in vehicle inspection/periodic inspection schedule table 200. On the other hand, when management table output section 24 determines that user A has logged out (YES at step S280), the series of processes ends.

The processing of steps S200 to S280 described above is similarly executed when the dealer terminal accesses the site. Note that, at step S220, when the dealer terminal accesses the site, management table output section 24 may transmit, to the dealer terminal, the list of users managed by the dealer terminal, and when a user is selected by the dealer terminal, the management table output section may transmit the inspection management table of the user to the dealer terminal.

As described above, vehicle management server 10 according to the present embodiment is configured to automatically create and update the inspection management table such the result of prediction of a failure or the degradation degree of a vehicle part is reflected, and allow the user and the dealer to view the inspection management table. According to the present embodiment having such a configuration, it is possible for a person involved in the inspection of a plurality of vehicles to easily grasp the situation and necessary information relevant to the inspection of the vehicles, to improve the convenience of the person involved in the periodic inspections of the vehicles.

Specifically, a user who owns a plurality of vehicles can reduce the complexity of his/her own vehicle management by viewing the inspection management table, and can easily grasp the actual state of each of the vehicles (for example, can distinguish between a vehicle which will have an inspection soon and a vehicle which is usable for the time being). In addition, by viewing the inspection management table, a dealer can grasp in advance a part and the like that should be intensively inspected or replaced at the time of inspection, so as to improve the convenience of procurement or the like of such a part and the like. In addition, according to the present embodiment, it is possible to obtain a remarkable effect of reducing a workload on an administrator.

In addition, the aforementioned embodiment merely describes an example of implementations for practicing the present invention, and should not be construed as limiting the technical scope of the present invention. That is, the present invention can be embodied in various forms without departing from the spirit, scope, or principal features of the present invention.

This application is based on Japanese Patent Application No. 2018-183402, filed on Sep. 28, 2018, the disclosure of which including the specification, drawings and abstract is incorporated herein by reference in its entirety.

INDUSTRIAL APPLICABILITY

The vehicle management system according to the present disclosure can be suitably used in order to reflect the result of prediction of a failure of a vehicle part in an inspection management table to improve the convenience of a person involved in the inspection of a vehicle.

REFERENCE SIGNS LIST

1 Vehicle management system
10 Vehicle management server (Vehicle inspection management system)
11 Communication section
12 Analysis section (Prediction section)
13 Database storage section
20 Inspection management section
21 Management table creation section
22 Additional record section
23 Management table update section
24 Management table output section
110 User information server
150 User terminal
200 Vehicle inspection/periodic inspection schedule table (Inspection management table)
210 Enlarged display area
220 Special inspection recommendation item occurrence icon

The invention claimed is:

1. A vehicle inspection management system, comprising:
a management table output circuit that outputs an inspection management table such that the inspection management table is displayed on a display section in accordance with an input command, the inspection management table recording information for each vehicle, the information indicating an expiration time of a periodic inspection predetermined for each vehicle in a specific column corresponding to the expiration time in a plurality of columns that are sequentially divided per predetermined period;
a prediction circuit that obtains control information on the vehicle to predict a failure or degradation of a part of the vehicle based on a time when the failure or degradation occurs depending on the traveling of the vehicle; and
an additional record circuit that additionally records a special inspection recommendation item in the specific column in which the expiration time of the periodic inspection is recorded to be displayed on the display section, when the failure or degradation of the part of the vehicle is predicted by the prediction circuit, wherein:
the special inspection recommendation item is an icon that indicates occurrence of an item to be inspected additionally during the periodic inspection, the icon being displayed in the specific column in which the item to be inspected has occurred among a plurality of the specific columns and
the management table output circuit outputs information on the part such that the information is displayed on the display section when the icon is selected.

2. The vehicle inspection management system according to claim 1, wherein
the management table output circuit outputs a column that divides a first period from a date at which the inspection management table is output, such that the column is displayed more largely than a column that divides a second period that comes after the first period.

3. The vehicle inspection management system according to claim 2, wherein
the additional record circuit additionally records the special inspection recommendation item when the prediction circuit predicts that the part fails or a degradation degree of the part exceeds a threshold during the second period.

4. The vehicle inspection management system according to claim 1, further comprising:
a management table creation circuit that creates the inspection management table for each user who owns a plurality of vehicles, wherein, in response to the input command received from a terminal of the user, the management table output circuit transmits the inspection management table of the user to the terminal.

5. The vehicle inspection management system according to claim 1, wherein
the icon is displayed in the specific column in which the item to be inspected has occurred among a plurality of the specific columns that arrives at the expiration time within a first period from a date of outputting the inspection management table.

6. The vehicle inspection management system according to claim 5, wherein
the icon is not displayed in the column in which the expiration time arrives within a second period that comes after the first period.

7. The vehicle inspection management system according to claim 5, wherein
the additional record circuit additionally causes the icon to be displayed in the specific column within the first period when the prediction circuit predicts the failure or degradation of the part of the vehicle during a second period that comes after the first period.

8. The vehicle inspection management system according to claim 1, wherein
the management table output circuit changes a color of the record indicating the expiration time corresponding to a type of inspection.

9. A vehicle inspection management system, comprising:
at least one processor configured to operate by:
obtaining control information for traveling each vehicle;
predicting that failure or degradation of a part of each vehicle occurs based on the control information; and
displaying a management table on a display,
the management table including
a plurality of columns that are sequentially divided per predetermined period for each vehicle and are aligned in a predetermined direction, and
information indicating an expiration time of a periodic inspection predetermined for each vehicle in a specific column corresponding to the expiration time among the plurality of columns for each vehicle,
wherein, in a case that the failure or degradation is predicted in the predicting, a specific icon is displayed additionally with the information in the specific column corresponding to a nearest expiration time, the specific icon indicating an item that occurs in accordance with the predicted failure or degradation and is inspected additionally during the periodic inspection.

10. The vehicle inspection management system according to claim 9, wherein the at least one processor further operates:
in the predicting, in case it is predicted that the failure or degradation occurs in a first period, notifying an emergency notification to the user, the first period including the nearest expiration time and
in the predicting, in case it is predicted that the failure or degradation occurs in a second period, displaying the specific icon with the information in the specific column in the first period, the second period being subsequent to the first period.

11. The vehicle inspection management system according to claim 9, wherein the at least one processor further operates:
displaying a plurality of first columns corresponding to a first period including the nearest expiration time larger in size than a plurality of second columns corresponding to a second period subsequent to the first period.

12. The vehicle inspection management system according to claim 9, wherein the at least one processor further operates:
in accordance with a user selecting the specific icon, displaying additional information relating to the part of vehicle, for which the failure or degradation is predicted, and corresponding to the specific icon.

* * * * *